United States Patent
Yeh et al.

(10) Patent No.: US 9,020,188 B2
(45) Date of Patent: Apr. 28, 2015

(54) METHOD FOR OBJECT DETECTION AND APPARATUS USING THE SAME

(75) Inventors: Po-Yu Yeh, Taipei (TW); Hui-Shan Kao, Taipei (TW)

(73) Assignee: ASUSTeK Computer Inc., Taipei (TW)

(*) Notice: Subject to any disclaimer, the term of this patent is extended or adjusted under 35 U.S.C. 154(b) by 182 days.

(21) Appl. No.: 13/476,028

(22) Filed: May 21, 2012

(65) Prior Publication Data

US 2012/0300981 A1 Nov. 29, 2012

Related U.S. Application Data

(60) Provisional application No. 61/488,808, filed on May 23, 2011.

(51) Int. Cl.
 *G06K 9/62* (2006.01)

(52) U.S. Cl.
 CPC .................................. *G06K 9/6257* (2013.01)

(58) Field of Classification Search
 None
 See application file for complete search history.

(56) References Cited

U.S. PATENT DOCUMENTS

| | | | |
|---|---|---|---|
| 7,050,607 B2 * | 5/2006 | Li et al. | 382/118 |
| 7,197,186 B2 * | 3/2007 | Jones et al. | 382/224 |
| 2005/0013479 A1 | 1/2005 | Xiao et al. | |
| 2006/0204110 A1 * | 9/2006 | Steinberg et al. | 382/224 |
| 2007/0047822 A1 * | 3/2007 | Kitamura et al. | 382/224 |
| 2007/0086660 A1 | 4/2007 | Ai et al. | |
| 2008/0253664 A1 * | 10/2008 | Li et al. | 382/226 |
| 2010/0272366 A1 | 10/2010 | Meng et al. | |

FOREIGN PATENT DOCUMENTS

| | | |
|---|---|---|
| CN | 101159018 | 4/2008 |
| CN | 101266704 | 9/2008 |
| CN | 101271515 | 9/2008 |
| CN | 101477625 | 7/2009 |
| CN | 101872477 | 10/2010 |

* cited by examiner

*Primary Examiner* — Jon Chang
(74) *Attorney, Agent, or Firm* — Jianq Chyun IP Office

(57) ABSTRACT

A method for object detection and an apparatus using the same are provided, and the method includes: An image is captured, in which the image includes a plurality of sampling-windows. A first-stage sub-classifier of a classifier is used to detect whether the sampling-windows contain an object therein. The classifier is rotated at least one time by a predetermined rotation angle and the first-stage sub-classifier of the classifier is used to detect whether the sampling-windows contain the object after each rotating, wherein when the object is detected within the sampling-windows, keep detecting whether the sampling-windows contain the object therein sequentially by a second-stage sub-classifier to an $N^{th}$ stage sub-classifier of the classifier with the same orientation. The image is rotated at least one time by a predetermined image angle and the above-mentioned operations of detecting the object is performed after each rotating. The sampling-windows containing the object are output.

15 Claims, 4 Drawing Sheets

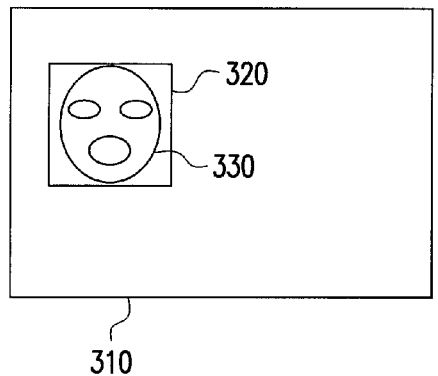
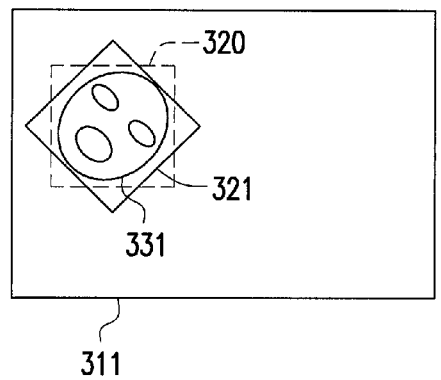
FIG. 2A  FIG. 2B
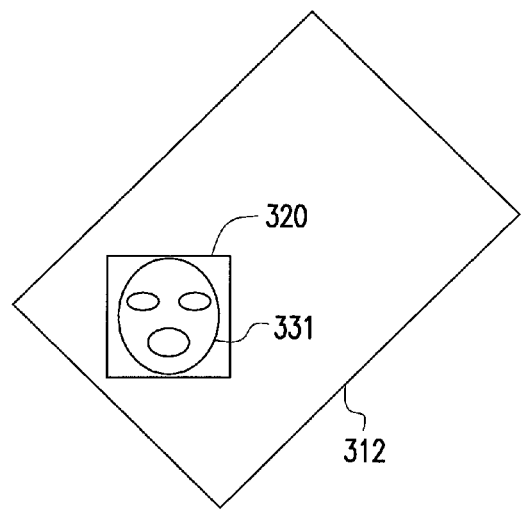
FIG. 2C

METHOD FOR OBJECT DETECTION AND APPARATUS USING THE SAME

CROSS-REFERENCE TO RELATED APPLICATION

This application claims the priority benefits of U.S. provisional application Ser. No. 61/488,808, filed on May 23, 2011. The entirety of the above-mentioned patent applications is hereby incorporated by reference herein and made a part of this specification.

BACKGROUND OF THE INVENTION

1. Field of the Invention

The invention generally relates to an image processing method and an apparatus using the same, and more particularly, to a method for detecting objects in an image and an apparatus using the same.

2. Description of Related Art

In 2001, Viola-Jones proposed a boosted cascade object detection algorithm (referred to VJ algorithm in following), and the algorithm has features of fast detection speed and high accuracy, so that the algorithm is widely used in real-time object detection in image, such as face detection. The VJ algorithm collects a number of data of a same object and generates a corresponding Haar-feature database (HFDB) through a boosted cascade training. When it is needed to detect the object in image, the HFDB is used to search for regions conforming with the Haar-feature of the object in different-size windows in the input image so as to finish the object detection.

SUMMARY OF THE INVENTION

Accordingly, the disclosure is directed to an object detection method and an apparatus using the same, which are capable of quickly detecting out a same object in different orientations.

The disclosure provides an object detection method, which includes following steps. First, an image is captured, in which the image includes a plurality of sampling-windows. Next, a first-stage sub-classifier of a classifier is used to detect whether the sampling-windows contain an object therein. Then, the classifier is rotated at least one time by a predetermined rotation angle and the first-stage sub-classifier of the classifier is used to detect whether the sampling-windows contain the object after each rotating, wherein when the object is detected within the sampling-windows, keep detecting whether the sampling-windows contain the object therein sequentially by a second-stage sub-classifier to an $N^{th}$ stage sub-classifier of the classifier with the same orientation, wherein N is a positive integer greater than 1. Further, the image is rotated at least one time by a predetermined image angle and the above-mentioned operations of detecting the object is performed after each rotating. Finally, the sampling-windows containing the object are output.

The disclosure also provides an object detection apparatus configured for an object detection apparatus and includes an image-capturing unit and a classifier. The image-capturing unit captures an image, in which the image includes a plurality of sampling-windows. The classifier is coupled to the image-capturing unit and includes $N^{th}$ stage sub-classifiers from a first-stage sub-classifier, in which N is a positive integer greater than 1. The classifier receives the image and uses the first-stage sub-classifier to detect whether the sampling-windows contain the object. The classifier is rotated at least one time by a predetermined rotation angle to detect whether the sampling-windows contain the object. When the sampling-windows contain the object by detection, the second-stage sub-classifier to the $N^{th}$-stage sub-classifier of the classifier with the same orientation is sequentially used to keep detecting whether the sampling-windows contain the object therein, in which N is a positive integer greater than 1, The disclosure discloses a method for object detection and an apparatus using the same, where by rotating the classifier in association with rotating the image, the object with multiple orientations in the image are detected. When first-stage sub-classifier at a certain angle detects out the object to be detected, the rest of the sub-classifiers from the second-stage sub-classifier to the $N^{th}$-stage sub-classifier are used to sequentially detect the object.

According to the description above, the method for object detection and the apparatus using the same in the disclosure only require an Harr-Feature Database (HFDB) with a single orientation and are able to detect the objects with all the orientations and require only a double of the time used by the conventional algorithm to detect an object with a single orientation.

BRIEF DESCRIPTION OF THE DRAWINGS

FIGS. 2A, 2B and 2C are diagrams showing the relationships between an object in the image and the sampling-windows.

DESCRIPTION OF THE EMBODIMENTS

Figure 1:
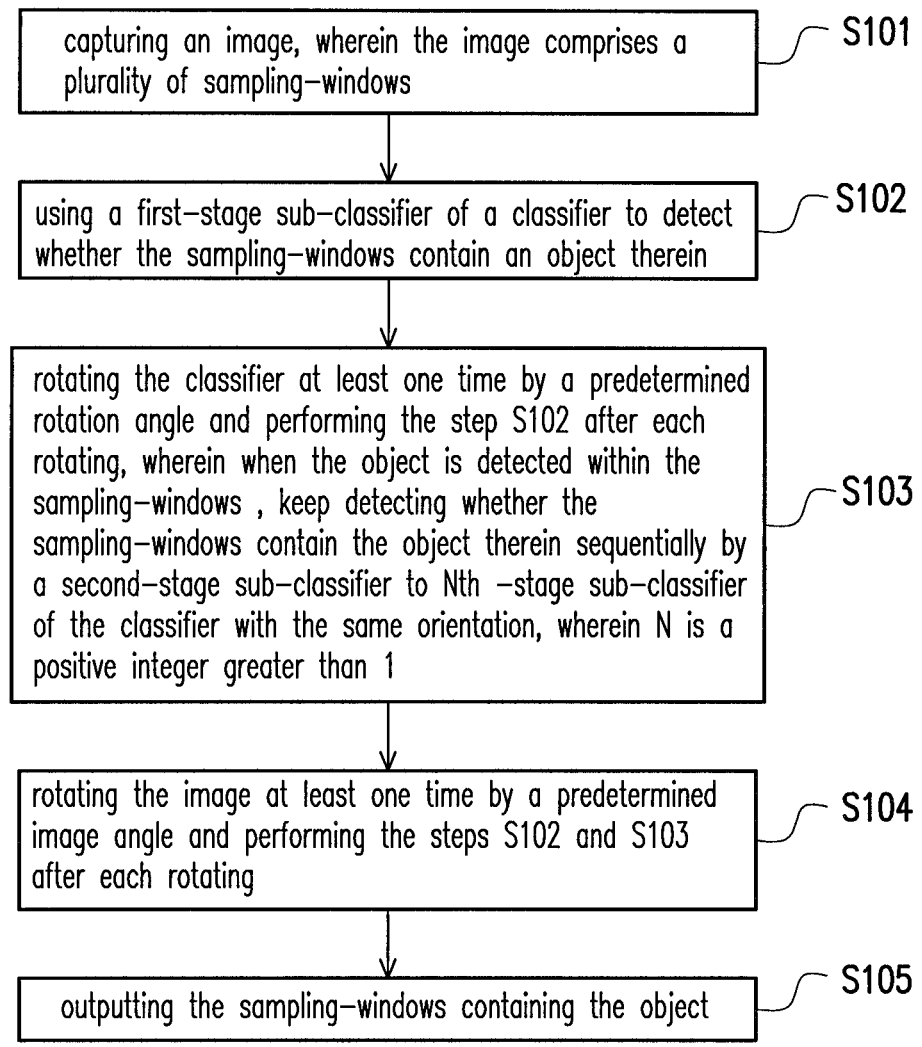
FIG. 1 is a flowchart of an object detection method according to an embodiment of the disclosure.

Reference will now be made in detail to method for object detection and an apparatus using the same according to an exemplary embodiment of the disclosure, wherein the same reference numbers are used in the drawings and the description to refer to the same or like parts.

FIG. 1 is a flowchart of an object detection method according to an embodiment of the disclosure. Referring to FIG. 1, first at step S101, an image is captured, in which the image includes a plurality of sampling-windows. Next at step S102, a first-stage sub-classifier of a classifier is used to detect whether the sampling-windows contain the object therein.

At step S103, the classifier is rotated at least one time by a predetermined rotation angle and the first-stage sub-classifier of the classifier is used to detect whether the sampling-windows contain the object after each rotating, wherein when the object is detected within the sampling-windows, keep detecting whether the sampling-windows contain the object therein sequentially by a second-stage sub-classifier to an $N^{th}$ stage sub-classifier of the classifier with the same orientation, wherein N is a positive integer greater than 1. Then at step S104, the image is rotated at least one time by a predetermined image angle and the above-mentioned operations (steps S101 and S103) of detecting the object is performed after each rotating. Finally at step S105, the detection is finished and the sampling-windows containing the object are output.

In exemplary embodiment of the disclosure, the method for object detection of the disclosure further includes the following step, before step S102: a pre-classifier is used to detect whether the sampling-windows contain the object therein, wherein the pre-classifier is an omni-orientation object detection classifier.

In order to explain the relationships between the sampling-windows and the object in more details, some figures are given for the purpose. FIGS. 2A, 2B and 2C are diagrams showing the relationships between an object in the image and the sampling-windows, in which the object to be detected is a human face. Referring to FIG. 2A, the image 310 includes a plurality of sampling-windows (for example, the sampling-window 320), in which the sampling-windows may be, or may be not, overlapped with each other depending on the real situation and the corresponding adjustment. When the sampling-window 320 contains the object 330, the classifier judges whether the present sampling-window (for example, the sampling-window 320) contains the object 330 to be detected therein through training the Haar-features included in every stage of the HFDB. The object to be detected, such as a human face, has different sizes in the images, the HFDB accordingly includes sampling-windows with different-sizes (for example, the sampling-window 320) for easily identifying a same, but in different-sizes corresponding to different distances, face in the images.

Referring to FIGS. 2B and 2C, the image 312 in FIG. 2C is obtained by anticlockwise rotating the image 311 in FIG. 2B by 45°. The object to be detected herein is also a human face, however the orientation of the face 331 in the image 311 is not perpendicular to the bottom edge of the images 311 and 312, where the object 320 in the images 311 and 312 is inclined to the bottom edge of the images 311 and 312 by clockwise 45°. In order to use the present HFDB (for example, the HFDB used to detect the object 330 in FIG. 2A) for detecting, there are two solutions as follows.

The first solution, as shown in FIG. 2B, is to rotate the sampling-window 320 into the orientation of the sampling-window 321 so as to use the HFDB corresponding to the orientation of the sampling-window 321 to detect the object 331. The second solution, as shown in FIG. 2C, is to rotate the image 311 into the image 312 so as to use the HFDB during detecting the object of FIG. 2A and the sampling-window 320 to detect the object 331. Although the object to be detected in FIGS. 2A, 2B and 2C is a human face in the disclosure, but the object to be detected is not limited to the human face, in which the important is to collect the image data corresponding to the specific object to be detected during training the HFDB. The disclosure adopts the above-mentioned two schemes to detect a same object in multiple orientations. Another embodiment association with figures are described in details as follows.

Figure 3:
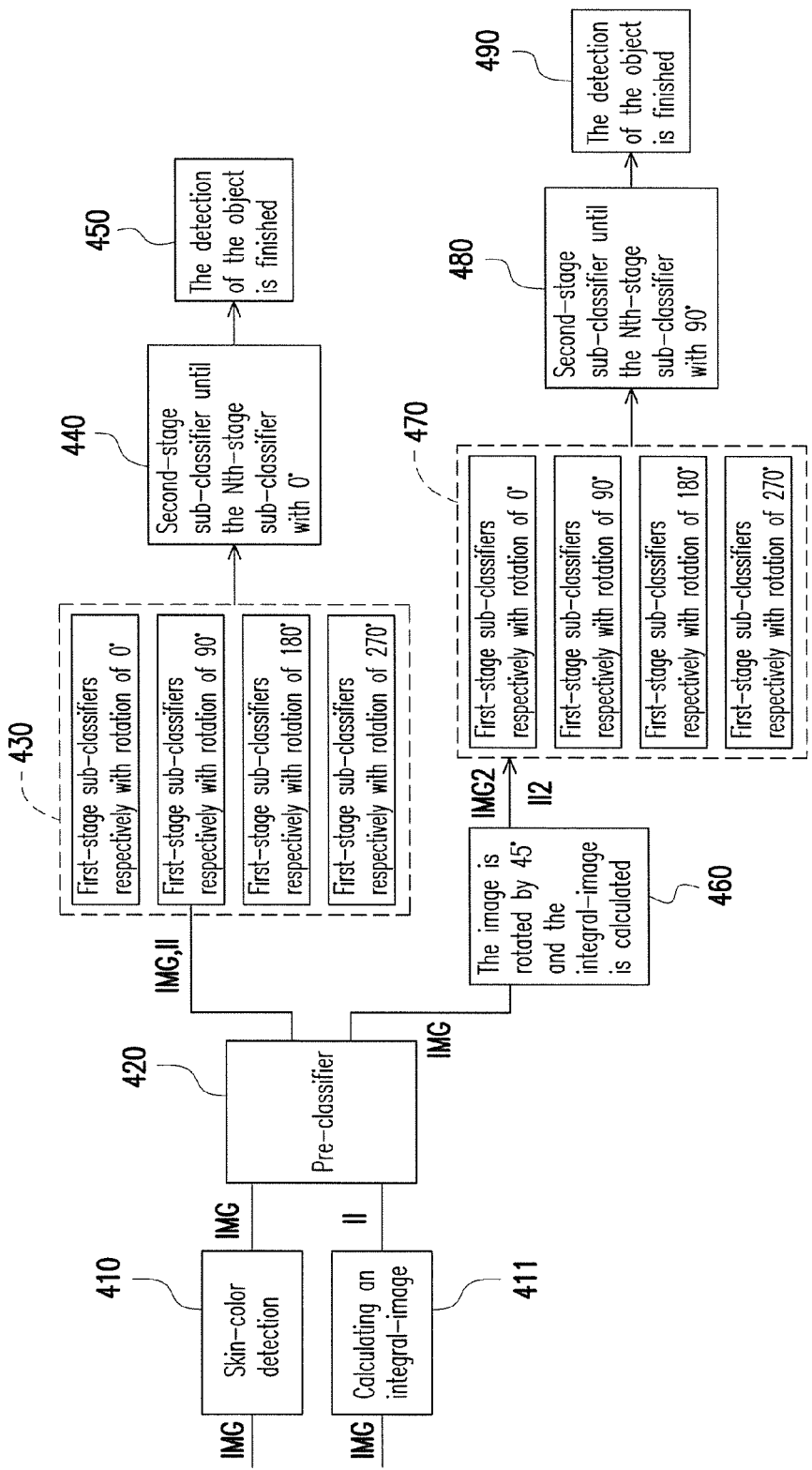
FIG. 3 is a data-processing flowchart of an object detection method according to an embodiment of the disclosure.

FIG. 3 is a data-processing flowchart of an object detection method according to an embodiment of the disclosure. It should be noted that the input in the embodiment is an image, however the classifier in the embodiment is based on a sampling-window at a time as a unit for detecting on all the sampling-windows in the image. In addition, the object to be detected in the embodiment is still a human face.

Referring to FIG. 3, first, a skin-color detection procedure 410 is performed on the captured image IMG through a sampling-window as a unit. Since the object to be detected is a face, in the skin-color detection procedure 410, only the sampling-windows in which the image content conforms with the range of skin colors are eligible for successively performing the object-detecting operations. On the contrary, all the sampling-windows in conforming with the range of skin colors are exclusive and labeled as non-object sampling-windows. After that, the object-detecting operations are not performed on the non-object sampling-windows. The way of labeling the non-object sampling-windows is varied with the different real situations. For example, a recording data can be used to record the representative coordination of the non-object sampling-window, which the disclosure is not limited to.

It should be noted that the capability of the skin-color detection procedure 410 for identifying an object in practice is less powerful, but it functions to quickly filter out the non-object sampling-windows. Accordingly in other embodiments, the skin-color detection procedure 410 can be replaced by other pre-filtering procedures or by a combination of the skin-color detection procedure 410 and the other pre-filtering procedures; for example, an edge filter can be adopted to filter out some sampling-windows only containing the image content with flat and no-detail edges, which the disclosure is not limited to.

Continuing to FIG. 3, an integral-image calculating procedure 411 is used on the input image IMG and then obtains an integral-image II. The integral-image II can simplify the calculation complexity for the successive procedures, for example, can simplify the complexity for calculating an integral value between the sampling-window and the Haar-features in procedures 430-440. The algorithm of the integral-image II is a known technique for the people skilled in the art, which is omitted to describe.

In procedure 420, a pre-classifier 420 receives the image IMG and the integral-image II for performing detecting on the sampling-windows excluding the non-object sampling-windows. In the embodiment, the pre-classifier 420 includes a a miniature HFDB derived by training the HFDB with the image data containing faces with various orientations. This step has a function similar to procedure 410 mainly for filtering out the non-object sampling-windows. Since the miniature HFDB is used mainly for filtering out the non-object sampling-windows rather than a real use for detecting an object, the pre-classifier has fewer HFDB stages and the false-detection rate thereof is higher than the regular HFDB as well, but it gains a shorter training time and can largely reduce the detecting time as well as largely reduce the total operation time.

Then in procedure 430, the classifier receives the image IMG and the integral-image II and a first-stage sub-classifier of the classifier is used to detect whether all the sampling-windows in the image contain the face therein. After that, the first-stage sub-classifier in the classifier is rotated at least one times by a predetermined classifier rotation angle. Meanwhile, as the first-stage sub-classifier stays in each orientation after a rotation, the first-stage sub-classifier is used to detect whether each the sampling-window contains the face. Since general Haar-features used in the sub-classifier are a rectangular block or a combination of rectangular blocks, the predetermined rotation angle in the embodiment is set with 90°. Therefore, in procedure 430 of the embodiment, the classifier uses the first-stage sub-classifiers respectively with rotation of 0°, 90°, 180° and 270° to detect whether the sampling-windows contain the face with the above-mentioned four orientations therein.

In general speaking, to use the first-stage sub-classifier for detecting the face, an integral value is calculated according to the Haar-features in the first-stage sub-classifier and the integral image content corresponding to the sampling-window. When the integral value is greater than a predetermined threshold of the first-stage sub-classifier, the detection by using the first-stage sub-classifier can be delivered to the next stage of sub-classifier. In the embodiment, the classifier compares the integral values obtained by calculation on the first-stage sub-classifier with the above-mentioned four directions (0°, 90°, 180° and) 270° with each other and the one with the highest integral value is chosen as a prediction direction.

As shown by FIG. 3, in the embodiment, the present sampling-window, i.e. the one with 0° has the highest integral value calculated by the 0° first-stage sub-classifier, so that in the next procedure 440, the classifier keep detecting whether the sampling windows contain the object therein sequentially by the second-stage sub-classifier to the $N^{th}$-stage sub-classifier with 0°, in which N is a positive integer greater than 1 corresponding to the stage number of the classifier's HFDB. If all the above-mentioned second-stage sub-classifier to the $N^{th}$-stage sub-classifier pass the detection, in the next procedure 450, the classifier concludes the sampling-window contains the object, i.e., the face.

In addition to detecting whether the image contain the object with only one orientation therein, the disclosure further provides a scheme that rotating the image by a predetermined image angle at least one time and performing the above-mentioned object-detecting operations in procedures 420 and 450 after each rotating. Referring to FIG. 3 again, in the embodiment, the predetermined image angle is 45°. In procedure 460, the classifier rotates the image by 45° and recalculates the integral-image 112 on the image IMG2 after rotation. Then in procedure 470, a detection operation same as procedure 430 is performed, where the classifier uses the first-stage sub-classifier with 0°, 90°, 180° and 270° to respectively calculate the integral values between the Haar-features and the sampling-windows of the rotated image IMG2. In the embodiment, the present sampling-window, i.e. the one with 90° has the highest integral value calculated by the 90° first-stage sub-classifier, so that in the next procedure 480, the classifier keeps detecting by using the second-stage sub-classifier to the $N^{th}$-stage sub-classifier with 90°. If detections of all the above-mentioned second-stage sub-classifier to the $N^{th}$-stage sub-classifier are passed, in the next procedure 490, the classifier concludes the sampling-window contains the face.

In this way, by combining the detection operations in procedures 420-450 and procedures 460-490, the classifier can detect out the object with eight orientations, i.e., with eight angles of 0°, 45°, 90°, 135°, 180°, 225°, 270° and 315° relative to the original image. The disclosure can also adjust the detectable object angle by setting the predetermined image angle and the predetermined rotation angle and further adjust the accuracy of object-detecting and the operation complexity. For example, by keeping the predetermined rotation angle the same as the above-mentioned embodiment but altering the predetermined image angle into 30°, the classifier is able to detect out an object with 12 angles, having a more accurate result in comparison with the above-mentioned 8 angles, which the disclosure is not limited to.

Figure 4:
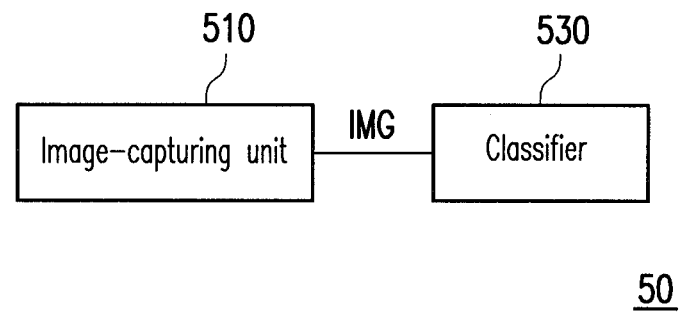
FIG. 4 is a block diagram of an object detection apparatus according to an embodiment of the disclosure.

The disclosure also provides an object detection apparatus suitable for the above-mentioned object detection method. FIG. 4 is a block diagram of an object detection apparatus according to an embodiment of the disclosure. Referring to FIG. 4, an object detection apparatus 50 includes an image-capturing unit 510 and a classifier 530. The image-capturing unit 510 captures an image IMG which includes a plurality of sampling-windows. The classifier 530 is coupled to the image-capturing unit 510 and includes a first-stage sub-classifier until an $N^{th}$-stage sub-classifier, in which N is a positive integer greater than 1.

The classifier 530 receives the image IMG and the first-stage sub-classifier is used to detect whether the sampling-windows contain the object therein, and the classifier is rotated at least one time by a predetermined rotation angle to detect whether the sampling-windows contain the object. When the sampling windows contain the object by detection, the classifier keep detecting whether the sampling windows contain the object therein sequentially by the second-stage sub-classifier to the $N^{th}$-stage sub-classifier in the classifier 530 with the same orientation, in which N is a positive integer greater than 1.

Then, the classifier 530 rotates the image IMG by a predetermined image angle at least one time. After rotating the image IMG each time, the first-stage sub-classifier is used to detect whether the sampling-windows contain the object therein. When the sampling windows contain the object by detection, the classifier keep detecting whether the sampling windows contain the object therein sequentially by the second-stage sub-classifier to the $N^{th}$-stage sub-classifier in the classifier 530, and the classifier 530 is rotated by the predetermined rotation angle at least one time. As rotating the classifier each time, the first-stage sub-classifier is used to detect whether the sampling-windows contain the object therein. After finishing the above-mentioned detection operations, the classifier 530 outputs the sampling-windows containing the object.

In one in embodiment, the apparatus for object detection for the disclosure further includes a pre-classifier (not shown), disposed between the image-capturing unit 510 and the classifier 530, receiving the image from the image-capturing unit 510 to detect whether the sampling windows contain the object therein, wherein the pre-classifier is a omni-orientation object detection classifier.

The implementation details of the object detection apparatus 50 can refer to the above-mentioned embodiment, which is omitted to describe. When the object detection apparatus 50 includes the steps of skin-color detection, the pre-classifier and the integral calculation in the embodiment of FIG. 3, the object detection apparatus 50 further includes a skin-color detection unit coupled to the image-capturing unit 510 (not shown), a pre-classifier coupled to the image-capturing unit 510 and the skin-color detection unit (not shown) and a calculation unit coupled to the classifier 530 and the image-capturing unit 510 (not shown), and the detail implementations thereof can refer to the embodiment of FIG. 3.

It should be noted that, the classifier 530 in the object detection apparatus 50 and the above-mentioned the pre-classifier, skin-color detection unit and calculation unit can be implemented respectively by a physical circuit or by an application program operated by a processor in association with a required memory, which the disclosure is not limited to.

In summary, the disclosure provides a method for object detection and an apparatus using the same, where a pre-filter for skin-color detection and a pre-classifier in fewer stages for omni-orientation detection are used to pre-filter out the non-object sampling-windows in the image. Then, by rotating the classifier in association, the whole object detection operation on a prediction direction among the multiple angle directions is performed. Further, the image is rotated to perform the same object detection operation so as to detected out whether the image contains the object to be detected in multiple orientations therein.

In this way, the disclosure can largely reduce the total object-detecting time and has no need to consume more time for training the HFDB to achieve the purpose of detecting the object with multiple orientations. Moreover, the disclosure can avoid the ragged and uneven detection results of the object with multiple orientations due to additional training the HFDB.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. An object detection method, comprising:
   a. capturing an image, wherein the image comprises a plurality of sampling-windows;
   b. using a first-stage sub-classifier of a classifier to detect whether the sampling-windows contain an object therein;
   c. rotating the classifier at least one time by a predetermined rotation angle and performing the step b after each rotating, wherein when the object is detected within the sampling-windows, keep detecting whether the sampling-windows contain the object therein sequentially by a second-stage sub-classifier to $N^{th}$-stage sub-classifier of the classifier with the same orientation, wherein N is a positive integer greater than 1;
   d. rotating the image at least one time by a predetermined image angle and performing the steps b and c after each rotating; and
   e. outputting the sampling-windows containing the object.

2. The method as claimed in claim 1 further comprising, before the step b, the following step:
   performing a skin-color detection procedure on the image.

3. The method as claimed in claim 1 further comprising, before the step b, the following step:
   using a pre-classifier to detect whether the sampling-windows contain the object therein, wherein the pre-classifier is an omni-orientation object detection classifier.

4. The method as claimed in claim 3, wherein the step of using a pre-classifier to detect whether the sampling-windows contain the object therein further comprising:
   for those sampling-windows that the pre-classifier detects no object therein, labeling those sampling-windows without the object therein as non-object sampling-windows.

5. The method as claimed in claim 4, wherein the steps b to d are not performed to the sampling-windows labeled as the non-object sampling-windows.

6. The method as claimed in claim 1, wherein after performing the step a, an integral image of the image is calculated and the step b and the step c are performed according to the integral image of the image.

7. The method as claimed in claim 6, when the step d is performed, the integral image of the image is recalculated and updated after each rotating of the image.

8. The method as claimed in claim 1, wherein the classifier comprises at least one set of Haar-feature blocks therein.

9. An object detection apparatus, configured for an object detection method and comprising:
   an image-capturing unit, capturing an image, wherein the image comprises a plurality of sampling-windows; and
   a classifier, coupled to the image-capturing unit and comprising Nth stage sub-classifiers from a first-stage sub-classifier, wherein N is a positive integer greater than 1;
   wherein the classifier receives the image, the first-stage sub-classifier is used to detect whether the sampling-windows contain the object, and the classifier is rotated least one time by a predetermined rotation angle to detect whether the sampling-windows contain the object, wherein when the sampling-windows contain the object by detection, keep detecting whether the sampling-windows contain the object therein sequentially by a second-stage sub-classifier to Nth-stage sub-classifier of the classifier with the same orientation , wherein N is a positive integer greater than 1,
   and the classifier further rotates the image at least one time by a predetermined image angle and detect whether the sampling-windows contain the object therein after each rotating.

10. The apparatus as claimed in claim 9, wherein the apparatus further comprises:
    a skin-color detection unit coupled between the image-capturing unit and the classifier, the skin-color detection unit receives the image and performs a skin-color detection on the image.

11. The apparatus as claimed in claim 9, wherein the apparatus further comprises:
    a pre-classifier, disposed between the image-capturing unit and the classifier, the pre-classifier receives the image from the image-capturing unit and detects whether the sampling-windows contain the object therein, and the pre-classifier is an omni-orientation object detection classifier.

12. The apparatus as claimed in claim 11, wherein for those sampling-windows that the pre-classifier detects no object therein, the pre-classifier labels the sampling-windows without the object therein as non-object sampling-windows.

13. The apparatus as claimed in claim 12, wherein the classifier does not detect whether the sampling windows contain an object when the sampling windows are labeled as the non-object sampling-windows.

14. The apparatus as claimed in claim 9, wherein the apparatus further comprises:
    a calculation unit, coupled to the classifier, the calculation unit calculates and obtains an integral image of the image and sends the integral image to the classifier.

15. The apparatus as claimed in claim 9, wherein the classifier comprises at least one set of Haar-feature blocks therein.

* * * * *